United States Patent
Kirichenko et al.

(10) Patent No.: US 12,348,836 B2
(45) Date of Patent: Jul. 1, 2025

(54) METHOD AND A SERVER FOR GENERATING MODIFIED AUDIO FOR A VIDEO

(71) Applicant: Direct Cursus Technology L.L.C, Dubai (AE)

(72) Inventors: Vladimir Kirichenko, Moscow (RU); Daria Petrenko, Snezhinsk (RU); Artem Panasyuk, Moscow (RU)

(73) Assignee: Y.E. Hub Armenia LLC, Yerevan (AM)

( * ) Notice: Subject to any disclaimer, the term of this patent is extended or adjusted under 35 U.S.C. 154(b) by 0 days.

(21) Appl. No.: 18/395,055

(22) Filed: Dec. 22, 2023

(65) Prior Publication Data

US 2024/0214646 A1    Jun. 27, 2024

(30) Foreign Application Priority Data

Dec. 27, 2022  (RU) .......................... RU2022134630

(51) Int. Cl.
*H04N 21/81* (2011.01)
*G10L 25/18* (2013.01)
(Continued)

(52) U.S. Cl.
CPC ......... *H04N 21/8106* (2013.01); *G10L 25/18* (2013.01); *G10L 25/57* (2013.01); *H04N 21/8547* (2013.01); *G10L 15/22* (2013.01)

(58) Field of Classification Search
None
See application file for complete search history.

(56) References Cited

U.S. PATENT DOCUMENTS

| | | |
|---|---|---|
| 8,250,046 B2 | 8/2012 | Heymans et al. |
| 8,364,463 B2 | 1/2013 | Miyamoto et al. |
| | (Continued) | |

FOREIGN PATENT DOCUMENTS

| | | |
|---|---|---|
| RU | 2016146267 A | 5/2018 |
| RU | 2662699 C2 | 7/2018 |

OTHER PUBLICATIONS

Oktem et al., "Prosodic Phrase Alignment for Machine Dubbing", Published on Aug. 20, 2019, Interspeech on Sep. 15-19, 2019, Graz, Austria, pp. 4216-4219, http://dx.doi.org/10.21437/Interspeech.2019-1621.

(Continued)

*Primary Examiner* — Omar S Parra
(74) *Attorney, Agent, or Firm* — BCF LLP

(57) ABSTRACT

A method and server for generating modified audio data for a video file are disclosed. The method includes acquiring a sequence of first audio portions, and a sequence of second audio portions in different languages. The method includes generating a plurality of candidate arrangements of the sequence of the second audio portions, where a given candidate arrangement is associated with candidate timestamps in the video file and candidate compression rates for respective ones from the sequence of second audio portions. The method includes selecting a target arrangement for the sequence of the second audio portions from the plurality of candidates. The selection is based on the target arrangement having a minimal penalty score amongst penalty scores associated with the plurality of candidates. The method includes generating at least one modified audio portion for the video file as a translation of the audio data using the target arrangement.

20 Claims, 8 Drawing Sheets

(51) Int. Cl.
*G10L 25/57* (2013.01)
*H04N 21/8547* (2011.01)
*G10L 15/22* (2006.01)

(56) References Cited

U.S. PATENT DOCUMENTS

| | | |
|---|---|---|
| 8,515,728 B2 | 8/2013 | Boyd et al. |
| 9,734,820 B2 | 8/2017 | Rangarajan Sridhar et al. |
| 10,991,399 B2 | 4/2021 | Shenkler |
| 11,145,305 B2 | 10/2021 | Minkin |
| 11,514,948 B1 * | 11/2022 | Nair .................... G06F 16/2365 |
| 2007/0143329 A1 | 6/2007 | Vigen |
| 2020/0040438 A1 | 2/2020 | Rachiele et al. |
| 2020/0404386 A1 | 12/2020 | McCartney, Jr. et al. |
| 2022/0046237 A1 | 2/2022 | Xu et al. |
| 2022/0084499 A1 | 3/2022 | Chernenkov et al. |
| 2023/0306207 A1 * | 9/2023 | Bojar ..................... G10L 15/19 |

OTHER PUBLICATIONS

Russian Search Report dated Jun. 3, 2024 issued in respect of the counterpart Russian Patent Application No. RU 2022134630.

* cited by examiner

METHOD AND A SERVER FOR GENERATING MODIFIED AUDIO FOR A VIDEO

CROSS-REFERENCE

The present application claims priority to Russian Patent Application No. 2022134630, entitled "Method and a Server for Generating Modified Audio for a Video", filed Dec. 27, 2022, the entirety of which is incorporated herein by reference.

FIELD

The present technology relates to audio processing and, specifically, to a method and a server for generating modified audio for a video.

BACKGROUND

Translating speech in a video from an originally recorded language to another language may involve labor-intensive efforts of voice dubbing translated audio portions onto the original video. Generally, voice dubbing refers to combining additional or supplementary recordings (dubbed speech) with originally recorded speech to create the finished soundtrack for the video. However, the dubbed speech may differ from the originally recorded speech and may not align with start and end times of the originally recorded speech. As a result, the translated audio may appear out of sync and may not be appealing to viewers.

U.S. Pat. No. 9,734,820 discloses a method for translating real-time speech which balance latency and accuracy of machine translations by segmenting the speech upon locating a conjunction.

SUMMARY

Developers of the present technology have appreciated certain technical drawbacks associated with the existing dubbing services. It is an object of the present technology to ameliorate at least some of the inconveniences present in the prior art.

General Algorithm

Developers have realized that some algorithms may shift starting timestamps of audio segments and change the speed of audio segments to better match original audio segments in a video file. In some cases, such algorithms may applied once MEL spectrograms have been generated for the translated text portions. However, in other cases, such algorithms may be applied once the waveforms for the translated text portions are generated.

Let $\{text_1, \ldots, text_T\}$ be a representation of input text. For text; the algorithm receives a start timestamp $gt\_start_i$ and a time length of the generated audio $gt\_dur_i$ in seconds, for example. The time length can be calculated from the time length associated with the corresponding MEL spectrogram. The algorithm outputs a new start timestamp $new\_start_i$ and a coefficient of change in audio speed $speed\_coef_i$.

It should be noted that the entire length of the audio may be split into segments of fixed length S and let $\{text_1, \ldots, text_K\}$ correspond to starting timestamps of the resulting segments. Let $\theta_{i,j}$ corresponds to a cost of optimization of first text; before $time_j$. In some cases, the penalty may be a combination of different penalty parameters. In other words, $\theta_{i,j}$ corresponds to the cost for all optimized texts from 1 until i before time j.

For example, a penalty parameter may be representative of an offset of the audio chunk starting timestamp relative to the original starting timestamp:

$$\text{offset\_cost}(gt\_start_i, new\_start_i) = (1 + |gt\_start_i - new\_start_i|)^2 - 1 \quad (1)$$

In the same example, an other penalty parameter may be representative of an increase in audio speed:

$$\text{scale\_cost}(gt\_dur_i, new\_dur_i) = \log(speed\_coef_i))^2, \quad (2)$$

$$speed\_coef_i = \min\left(1, \frac{new\_dur_i}{gt\_dur_i}\right)$$

As such, the value of the penalty can be recursively calculated via the temporally previous ones as:

$$\theta_{i,j} = \min_{k<j}(\theta_{i-1,k} + \alpha \cdot \text{scale\_cost}(gt\_dur_{i-1}, S*(j-k))) + \quad (3)$$

$$\text{offset\_cost}(gt\_start_i, S*j)$$

The goal is to find an arrangement corresponding to the minimum accumulated total value of the penalty $\min_j \theta_{T,j}$. During one iteration, the values of i are calculated, of the column $\theta_{i,:}$ based on the values of the previous column $\theta_{i-1,:}$, and the optimal index of the start timestamp of the previous text k from equation (3) is stored for each pair (i, j).

After computing values of an entire matrix $\Theta$, $j* = \text{argmin}_j \theta_{T,j}$ is calculated for the last column, the starting timestamp of the last text portion is obtained and, using the stored values k from equation (3), backtracking could be managed. Developers of the present technology have realized that the complexity of the resulting algorithm is $O(TK^2)$.

In some embodiments, it can be said that a matrix (table) may be received, wherein each column associated with audio portion and incudes all possible values $\theta_{i,j}$. The matrix counts column by column and $\theta_{i,j}$ in each subsequent column counts based on elements from the previous column. The purpose is to find an optimized solution. Information about the optimal audio "stacking" can be obtained by having a final value because it is associated with the value in the previous column, which is associated in turn with the value in the column before that one, and so on. For that reason, backtracking operation may be carried out.

It is contemplated that when setting the problem, it is assumed that the text begins at any of the discrete points. Optimization of new audio portion timing over arbitrary time is too complex a task and requires considerable resources for running the algorithm. In at least some embodiments of the present technology, a time component is quantized in a form of a "time grid". It can be said that that each translated audio portion may be located on this time grid. Quantization can be performed on a time grid, for example, with points located at about 50 milliseconds. Once the time grid is generated, penalties for offset of the audio chunk starting timestamp and an increase in audio speed are computed.

Embodiment of Algorithm

Developers have realized that shifting the starting timestamps of audio segments may not be desirable. In some embodiments, a size of a maximum allowable offset L (measured in the number of audio chunks) can be selected and possible values new_start$_i$ can be considered in the range:

$$[gt\_start_i - S*L, gt\_start_i + S*L] \quad (4)$$

Then the penalty for going beyond the boundaries of the entire audio can be added to the formula for calculating the penalty:

$$time\_cost(time_j) = \begin{cases} \infty, & \text{IF } time_j < 0 \text{ OR } time_j > full\_audio\_len \\ 0, & \text{ELSE} \end{cases} \quad (5)$$

which results in the following:

$$\theta_{i,j} = \min_{i-1,k}(\theta_{i-1,k} + \quad (6)$$
$$\alpha \cdot scale\_cost(gt\_dur_{i-1}, (gt\_start_i + S*j) - (gt\_start_i + S*k))) +$$
$$offset\_cost(gt\_start_i, gt\_start_k + S*j) + time\_cost(gt\_start_i + S*j)$$

Developers of the present technology have realized that the complexity of the resulting algorithm is $O(TL^2)=O(T)$, and hence linear with respect to the number of text portions.

In this embodiment, the value offset_cost depends only on a size of the offset of the starting timestamp of a text portion and are the same for all columns of the matrix. Developers have realized that these values can be calculated once and reused.

When calculating scale_cost, $$scale\_cost(gt\_dur_{i-1}, (gt\_start_i + S*j) - (gt\_start_{i-1} + S*k)) = \quad (7)$$
$$scale\_cost(gt\_dur_{i-1}, (gt\_start_1 - gt\_start_{i-1}) + S*(j-k))$$

for a fixed i, expression does not require $L^2$, but rather 4L different values, since $(j-k) \in [-2L; 2L]$. As such, a matrix of all possible values can be computed and used for indexation.

Instead of storing the entire matrix $\Theta$, the last column can be stored while keeping the optimal index k start timestamp of the previous text portion for each pair (i,j). Also, the penalty parameters of the penalty can be weighed in some embodiments.

In a first broad aspect of the present technology, there is provided a method of generating modified audio data for a video file, the video file being associated with audio data, the method executable by a server. The method comprises acquiring, by the server, a sequence of first audio portions, a given one from the sequence of first audio portions being representative of a given sentence in a first language and being associated with a timestamp in the video file. The method comprises acquiring, by the server, a sequence of second audio portions, a given one from the sequence of second audio portions being representative of an other given sentence in a second language and being associated with a time length, the other given sentence being a translation of the given sentence. The method comprises generating, by the server, a plurality of candidate arrangements of the sequence of the second audio portions, a given candidate arrangement being associated with candidate timestamps in the video file and candidate compression rates for respective ones from the sequence of second audio portions. The method comprises selecting a target arrangement for the sequence of the second audio portions from the plurality of candidate arrangements, the selecting being based on the target arrangement having a minimal penalty score amongst penalty scores associated with respective ones from the plurality of candidate arrangements. A given penalty score of the given candidate arrangement is generated based on: (i) a combination of differences between timestamps associated with respective ones from the sequence of first audio portions and corresponding ones from the given candidate arrangement, (ii) a presence of overlap between a given pair of second audio portions if: the second audio portions from the sequence of second audio portions are arranged in the video file in accordance with the candidate timestamps and the candidate compression rates. The method comprises generating at least one modified audio portion for the video file as a translation of the audio data using the target arrangement.

In some embodiments of the method, the given one from the sequence of first audio portions is a waveform audio signal.

In some embodiments of the method, the given one from the sequence of first audio portions is a mel-spectrogram.

In some embodiments of the method, the method further comprises generating, by the server, the sequence of second audio portions based on the sequence of first audio portions.

In some embodiments of the method, the timestamp associated with the given one from the sequence of first audio portions is a start timestamp. The given one from the sequence of first audio portions is further associated with an end timestamp in the video file. The candidate timestamps of the given candidate arrangement include candidate start timestamps and candidate end timestamps for respective second audio portions from the given candidate arrangement. The given penalty score is further generated based on: a combination of differences between start timestamps associated with respective ones from the sequence of first audio portions and corresponding candidate start timestamps from the given candidate arrangement, and a combination of differences between end timestamps associated with respective ones from the sequence of first audio portions and corresponding end timestamps from the given candidate arrangement.

In some embodiments of the method, the timestamp associated with the given one from the sequence of first audio portions is a center timestamp. The candidate timestamps of the given candidate arrangement include candidate center timestamps for respective second audio portions from the given candidate arrangement. The given penalty score is further generated based on a combination of differences between center timestamps associated with respective ones from the sequence of first audio portions and corresponding candidate center timestamps from the given candidate arrangement.

In some embodiments of the method, the penalty score is further generated based on a combination of candidate compression rates of the given candidate arrangement.

In some embodiments of the method, the generating the at least one modified audio portion is executed by the server in an off-line mode. The method further comprises storing, by the server, the video file with the at least one modified audio portion in a storage.

In some embodiments of the method, the generating the at least one modified audio portion is executed by the server in a streaming mode. The method further comprises transmitting, by the server, a video portion of the video file with the at least one modified audio portion to a user device.

In some embodiments of the method, the method further comprises acquiring, by the server, a new first audio portion being representative of an additional sentence in the first language. The method further comprises acquiring, by the server, a new second audio portion being representative of an other additional sentence in a second language, the other additional sentence being a translation of the additional sentence. The new second audio portion and a subset of second audio portions from the sequence of second audio portions form a new sequence of second audio portions. The subset of second audio portions excludes a first one from the sequence of second audio portions having been used to generate the at least one modified portion. The method further comprises generating, by the server, a new plurality of candidate arrangements for the new sequence of the second audio portions. The method further comprises selecting, by the server, a new target arrangement for the new sequence of the second audio portions from the new plurality of candidate arrangements. The method further comprises generating, by the server, a new modified audio portion by modifying a first one from the new sequence of second audio portions in accordance with the new target arrangement. The method further comprises transmitting, by the server, an other portion of the video file with the new modified audio portion to the user device.

In a second broad aspect of the present technology, there is provided a server for generating modified audio data for a video file, the video file being associated with audio data. The server is configured to acquire a sequence of first audio portions, a given one from the sequence of first audio portions being representative of a given sentence in a first language and being associated with a timestamp in the video file. The server is configured to acquire a sequence of second audio portions, a given one from the sequence of second audio portions being representative of an other given sentence in a second language and being associated with a time length, the other given sentence being a translation of the given sentence. The server is configured to generate a plurality of candidate arrangements for the sequence of the second audio portions, a given candidate arrangement being associated with candidate timestamps in the video file and candidate compression rates for respective ones from the sequence of second audio portions. The server is configured to select a target arrangement for the sequence of the second audio portions from the plurality of candidate arrangements. The server is configured to select based on the target arrangement having a minimal penalty score amongst penalty scores associated with respective ones from the plurality of candidate arrangements. A given penalty score of the given candidate arrangement being generated based on: (i) differences between timestamps associated with respective ones from the sequence of first audio portions and corresponding ones from the given candidate arrangement, and (ii) a presence of overlap between a given pair of second audio portions if: the second audio portions from the sequence of second audio portions are arranged in the video file in accordance with the candidate timestamps and the candidate compression rates. The server is configured to generate at least one modified audio portion for the video file as a translation of the audio data using the target arrangement.

In some embodiments of the server, the given one from the sequence of first audio portions is a waveform audio signal.

In some embodiments of the server, the given one from the sequence of first audio portions is a mel-spectrogram.

In some embodiments of the server, the server is further configured to generate the sequence of second audio portions based on the sequence of first audio portions.

In some embodiments of the server, the timestamp associated with the given one from the sequence of first audio portions is a start timestamp, and the given one from the sequence of first audio portions is further associated with an end timestamp in the video file. The candidate timestamps of the given candidate arrangement include candidate start timestamps and candidate end timestamps for respective second audio portions. The given penalty score is further generated based on: a combination of differences between start timestamps associated with respective ones from the sequence of first audio portions and corresponding candidate start timestamps from the given candidate arrangement, and a combination of differences between end timestamps associated with respective ones from the sequence of first audio portions and corresponding end timestamps from the given candidate arrangement.

In some embodiments of the server, the timestamp associated with the given one from the sequence of first audio portions is a center timestamp. The candidate timestamps of the given candidate arrangement include candidate center timestamps for respective second audio portions. The given penalty score is further generated based on: a combination of differences between center timestamps associated with respective ones from the sequence of first audio portions and corresponding candidate center timestamps from the given candidate arrangement.

In some embodiments of the server, the penalty score is further generated based on a combination of candidate compression rates of the given candidate arrangement.

In some embodiments of the server, the server is configured to generate the at least one modified audio portion in an off-line mode and further configured to store the video file with the at least one modified audio portion in a storage.

In some embodiments of the server, the server is configured to generate the at least one modified audio portion in a streaming mode and further configured to transmit a video portion of the video file with the at least one modified audio portion to a user device.

In some embodiments of the server, the server is further configured to acquire a new first audio portion being representative of an additional sentence in the first language. The server is further configured to acquire a new second audio portion being representative of an other additional sentence in a second language, the other additional sentence being a translation of the additional sentence. The new second audio portion and a subset of second audio portions from the sequence of second audio portions form a new sequence of second audio portions. The subset of second audio portions excludes a first one from the sequence of second audio portions having been used to generate the at least one modified portion. The server is further configured to generate a new plurality of candidate arrangements for the new sequence of the second audio portions. The server is further configured to select a new target arrangement for the new sequence of the second audio portions from the new plurality of candidate arrangements. The server is further configured to generate a new modified audio portion by modifying a first one from the new sequence of second audio portions in accordance with the new target arrangement. The server is further configured to transmit an other portion of the video file with the new modified audio portion to the user device.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
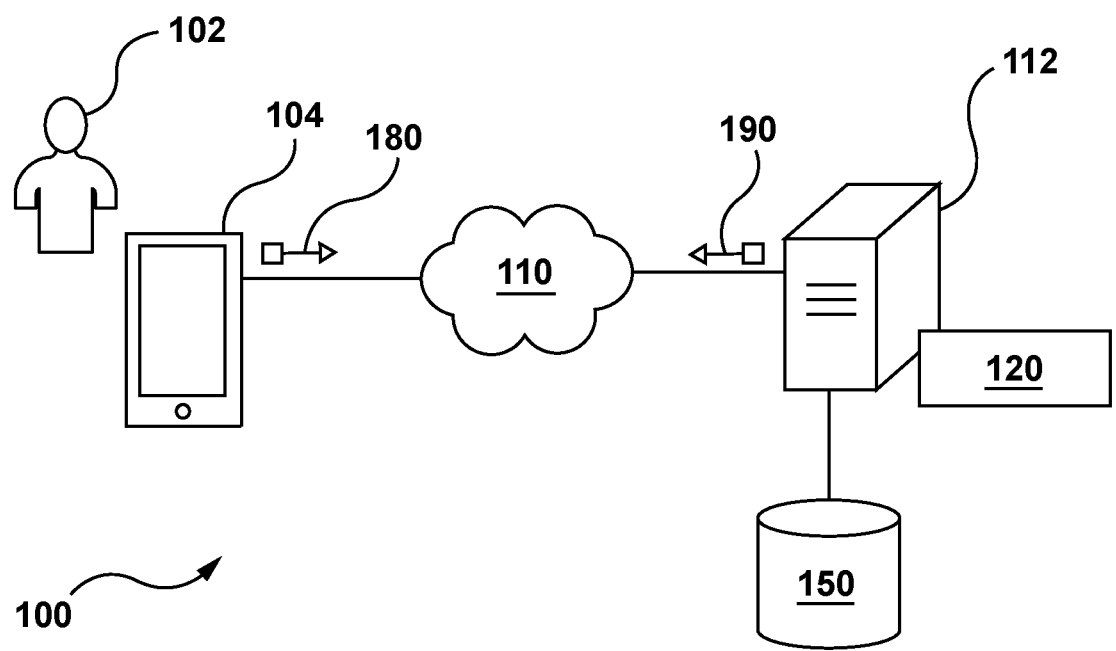
FIG. 1 depicts a system suitable for implementing non-limiting embodiments of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

Generally speaking, the system 100 is configured to provide electronic dubbing services for a user 102 of an electronic device 104. For example, the system 100 may be configured to acquire a video file with an audio in a first language, generate an audio in a second language, and provide to the user the video file with the second language. At least some components of the system 100 will now be described, however, it should be understood that other components to those depicted in FIG. 1 may be part of the system 100 without departing from the scope of the present technology.

Communication Network

The electronic device 104 is communicatively coupled to a communication network 110 for communication with the server 112. For example, the electronic device 104 may be communicatively coupled with the server 112 via the communication network 110 for providing the user 102 with online services, such as video streaming engines, for example. The communication network 110 is configured to transmit inter alia data between the electronic device 104 and the server 112 in a form of one or more data packets.

In some non-limiting embodiments of the present technology, the communication network 110 can be implemented as the Internet. In other non-limiting embodiments of the present technology, the communication network 110 can be implemented differently, such as any wide-area communication network, local-area communication network, a private communication network and the like. How a communication link (not separately numbered) between the electronic device 104 and the communication network 110 is implemented will depend inter alia on how the electronic device 104 is implemented.

Merely as an example and not as a limitation, in those embodiments of the present technology where the electronic device 104 is implemented as a wireless communication device (such as a smartphone), the communication link can be implemented as a wireless communication link (such as but not limited to, a 3G communication network link, a 4G communication network link, Wireless Fidelity, or WiFi® for short, Bluetooth® and the like). In those examples where the electronic device 104 is implemented as a notebook computer, the communication link can be either wireless (such as Wireless Fidelity, or WiFi® for short, Bluetooth® or the like) or wired (such as an Ethernet based connection).

Electronic Device

The system 100 comprises the electronic device 104, the electronic device 104 being associated with the user 102. As such, the electronic device 104 can sometimes be referred to as a "client device", "end user device", "client electronic device" or simply "device". It should be noted that the fact that the electronic device 104 is associated with the user 102 does not need to suggest or imply any mode of operation—such as a need to log in, a need to be registered, or the like.

The implementation of the electronic device 104 is not particularly limited, but as an example, the electronic device 104 may be implemented as a personal computer (desktops, laptops, netbooks, etc.), a wireless communication device (such as a smartphone, a cell phone, a tablet and the like), as well as network equipment (such as routers, switches, and gateways). The electronic device 104 comprises hardware and/or software and/or firmware (or a combination thereof), as is known in the art, to execute a browser application.

Generally speaking, the purpose of the browser application is to enable the user 102 to access one or more network resources, such as web pages, for example. How the browser application is implemented is not particularly limited. One example of the browser application may be embodied as a Yandex™ browser.

The user 102 may use the browser application for accessing a video streaming platform for streaming video content. For example, the electronic device 104 may be configured to generate a request indicative of video content that the user 102 desires to view. In some embodiments, the request from the electronic device 104 may further be indicative of a desired language for the audio accompanying the video content. Also, the electronic device 104 may be configured to receive a response (not depicted) for reproducing the video content and the audio in a selected language to the user 102. Typically, the request and the response may be transmitted from and to the electronic device 104 via the communication network 110. The content of the request and the response may depend on inter alia whether the video and audio content are live streamed or not.

Database

The system 100 also comprises a database 150 which is communicatively coupled to the server 112 and is configured to store information extracted or otherwise determined or generated by the server 112. Generally speaking, the database 150 may receive data from the server 112 which was extracted or otherwise determined or generated by the server 112 during processing for temporary and/or permanent storage thereof and may provide stored data to the server 112 for use thereof. It is contemplated that the database 150 may be split into several distributed databases without departing from the scope of the present technology.

The database 150 may be configured to store data for supporting video streaming engines of the server 112. To that end, the database 150 may store inter alia a plurality of digital content items including video and audio files representative of media content consumable by the user 102. Examples of digital content items can include, but are not limited to, digital video, digital movies, digital audio, digital music, website content, social media content, and the like.

Server

The system 100 also comprises the server 112 that can be implemented as a conventional computer server. In the depicted non-limiting embodiments of the present technology, the server 112 is a single server. In alternative non-limiting embodiments of the present technology, functionalities of the server 112 may be distributed and may be implemented via multiple servers. The server 112 may include one or more processors, one or more non-transitory memory devices, computer-readable instructions, and/or additional hardware components, additional software components, and/or combination thereof, for implementing various functionalities of the server 112, without departing from the scope of the present technology.

Generally speaking, the server 112 can be under control and/or management of a video service provider (not depicted), such as, for example, an operator of Yandex™ video streaming platform. It is contemplated that the provider of the video streaming services, and the provider of the browser application may be the same provider. For example, the browser application (e.g., Yandex™ browser) and the video streaming engines (e.g., Yandex™ video streaming engines) may be provided, controlled and/or managed by the same operator or entity.

As mentioned above, the server 112 hosts a video streaming engine (not depicted). Broadly speaking, the video streaming engine is embodied as a plurality of computer-implemented procedures that are used for providing video content to the user 102 accompanied by audio content in one or more languages.

Developers of the present technology have realized that a large amount of the media content broadcasted online, for example, is originally produced in English while many users do not speak English. In order to make such media content accessible to a large variety of users, conventional solutions provide either subtitles in different languages, or dubbing audio content in different languages. Developers have devised a methods and systems that are configured to provide video dubbing services where audio content in one or more languages is generated by the server 112, without necessitating human intervention for generate audio content in the one or more languages.

In some embodiments, the server 112 is configured to provide automatic dubbing services where original audio content is translated into one or more languages, and is reproduced in a male or female voice, and which can be superimposed onto the original video content for consumption by the user 102.

As it will be described in greater details herein further below, the automatic dubbing services may be implemented using several neural networks which can be configured to: (i) recognize speech (convert audio into text), split the recognized text into separate segments (e.g., sentences), translate segments into the target language, and generate the dubbing content that is overlayed over the original video content. The system can additionally determine the gender of the speaker and synthesize the appropriate voice characteristics.

Figure 2:
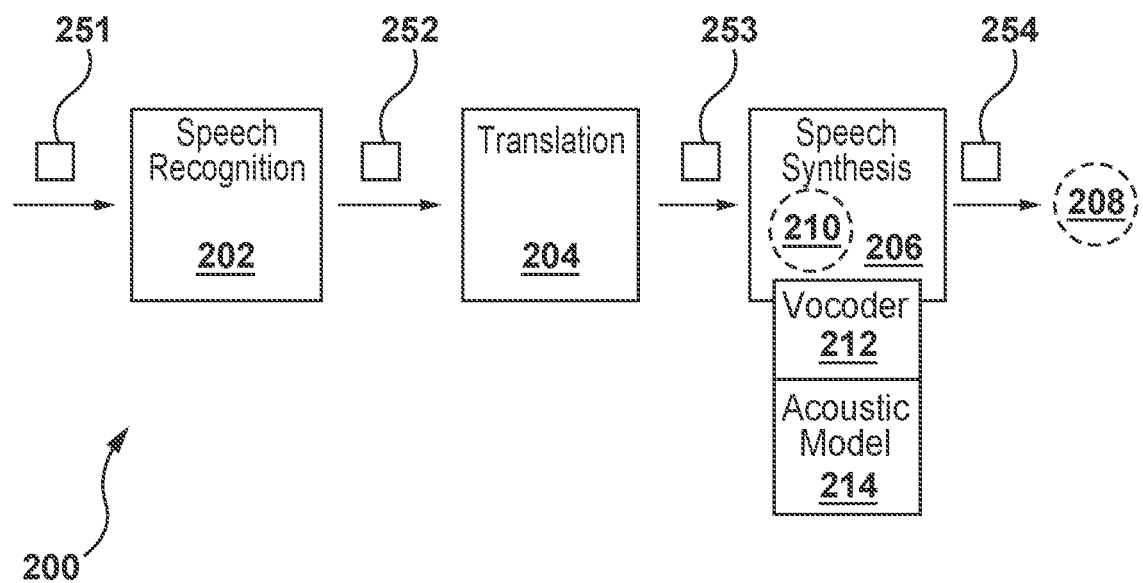
FIG. 2 depicts a processing pipeline performed by a server of FIG. 1 for generating modified audio based on original audio from a video file, in accordance with at least some embodiments of the present technology.

With reference to FIG. 2 there is depicted a processing pipeline 200 executed by the server 112 in some embodiments of the present technology. A first procedure of the processing pipeline 200 is performed by a speech recognition module 202 on an original audio content. Broadly, the first procedure is used to receive original audio content 251 and produce a speech recognition data 252.

The speech recognition data 252 may represent automatically recognized speech or other audio from a video content item. The speech recognition data 252 may include a plurality of generated character strings, where each individual generated character string represents a word, phrase, or set of characters spoken by a speaker within the video content item. Each generated character string within the speech recognition data 252 may by associated with timing information that represents the specific time at which the generated character string was spoken within the video. For example, the timing information for the phrase "Good morning" may include timing for when the word "Good" is spoken and timing for when the word "morning" is spoken. The timing information may include specific start and end times (e.g., timestamps) for each generated character string or may include a specific start time and duration information for each generated character string.

In some embodiments, the speech recognition module 202 may be configured to further process original audio content to remove artifacts that are not related to speech such as music sounds, for example. In further embodiments, the speech recognition module 202 may be configured to insert punctuation marks and/or may further divides words into sub-word segments.

In some embodiments, the speech recognition module 202 may comprise a Speech-To-Text (STT) model. The STT model may be a machine-learning model such as a Neural Network (NN) model. Non-limiting examples of NN models that can be used for implementation of the present technology may include a Recurrent NN model and/or a Long short-term memory NN model. In additional embodiments, the machine-learning model may be implemented as a transformer model.

In at least some embodiments, there is provided an Automatic Speech Recognition (ASR) model. The ASR may be implemented as a combination of a seq2seq model and a Convolutional Neural Network (CNN). The seq2seq model may be implemented as a VGGTransformer model. Additionally or optionally, a CTC transformer may also be used for intermediate recognitions (e.g., partials). In at least some embodiments, the ASR model may be implemented similarly to an ASR model disclosed in a co-owned U.S. Pat. No. 11,145,305, the contents of which is incorporated herein by reference in its entirety.

A second procedure of the processing pipeline 200 is performed by a translation module 204 on the speech recognition data 252. Broadly, the second procedure is used to receive the speech recognition data and produce a translation data 253.

The translation data 253 represents a translation of character strings from the speech recognition data 252 (which is in an original language of the original audio content) in a second language. The translation module 204 may also receive information about the gender associated with a person speaking in the original audio content. In some cases, the translation module 204 may generate different translation data 253 depending on inter alia whether the speaking is male or female.

It is contemplated that the translation module 204 may be configured to execute a plurality of translation models for translation character strings from the original language into one or more second languages.

How a given translation model of the translation module 204 is implemented is not particularly limiting. In one embodiment, a translation model may be implemented as a Statistical Machine Translation (SMT) model trained to translate sentences from a first language to a second language.

Broadly, SMT deals with automatically mapping sentences in one human language (for example, French) into another human language (such as English). The first language is called the source and the second language is called the target. This process can be thought of as a stochastic process. There are many SMT variants, depending upon how translation is modeled. Some approaches are in terms of a string-to-string mapping, some use trees-to-strings, and some use tree-to-tree models. A SMT model is estimated from parallel corpora (source-target pairs) and/or from monolingual corpora (examples of target sentences). It is contemplated that the server 112 may be configured to generate a given translation function by training an SMT model based on aligned corpuses of text between a respective pair of languages. It is contemplated that a given translation model may be implemented as an encoder-decoder type model, without departing from the scope of the present technology.

In some embodiments, the translation model may be embodied as a NN with a transformer architecture. The transformer architectures' ability to consider broad context introduced with Long Short-Term Memory (LSTM) networks and later, by the attention mechanism, may be beneficial for use as the translation model. It is contemplated that the translation model may be provided with additional feature, such as a gender of the speaker, for example.

A third procedure of the processing pipeline 200 is performed by a speech synthesis module 204 on the translation data 253. Broadly, the third procedure is used to receive the translation data 253 and produce the speech synthesis data 254.

The speech synthesis data 254 comprises translated audio content generated based on inter alia the translation data 253 and where the translated audio content is representative of sentences spoken in one (or more) other languages. The speech synthesis module 206 may comprise an acoustic model 214 and a vocoder 212.

It is contemplated that speech synthesis can be achieved by employing deep neural models, which are sometimes referred to as "acoustic models" and "vocoders". It should be noted that a acoustic model can generate mel-spectrograms based on phonemes, for example, and a vocoder can synthesize time-domain waveforms, and which can be conditioned on mel-spectrograms from a text-to-spectrogram model.

In some embodiments of the present technology, the acoustic model may be embodied as a known Tacotron 2 model. Broadly, Tacotron 2 is a recurrent sequence-to-sequence feature prediction network with attention mechanism(s) that predicts a sequence of mel spectrogram frames from an input character sequence. In other embodiments, the vocoder may be embodied as a known HiFi-GAN model. Broadly, the HiFi-GAN architecture may comprise one generator and two discriminators: multi-scale and multi-period discriminators. The generator is a fully convolutional neural network. It uses a mel-spectrogram as input and up samples it through transposed convolutions until a length of the output sequence matches the temporal resolution of raw waveforms. Every transposed convolution is followed by a multi-receptive field fusion (MRF) module. In other embodiments, the vocoder may be embodied similarly to a model described in a co-owned US patent application US2022/084499, entitled "Method and server for a text-to-speech processing", published on Mar. 17, 2022, the contents of which is incorporated herein by reference in its entirety.

In the context of the present technology, the server 112 is configured to perform an alignment operation 208 and/or an alignment operation 210. It should be noted that alignment may be used because the translated audio content may differ from the original audio content in time length, for example, and may not "align" with the video content in a same manner. For example, without alignment, the translated audio content may appear out of sync with the video content and may not be appealing to viewers.

Developers have realized that some conventional solutions may be used to speed up or slow down audio segments and/or add pauses, if needed. However, such solutions result in translated audio segments that are either too fast, too slow or contain too many pauses, which is detrimental to user satisfaction.

Figure 3:
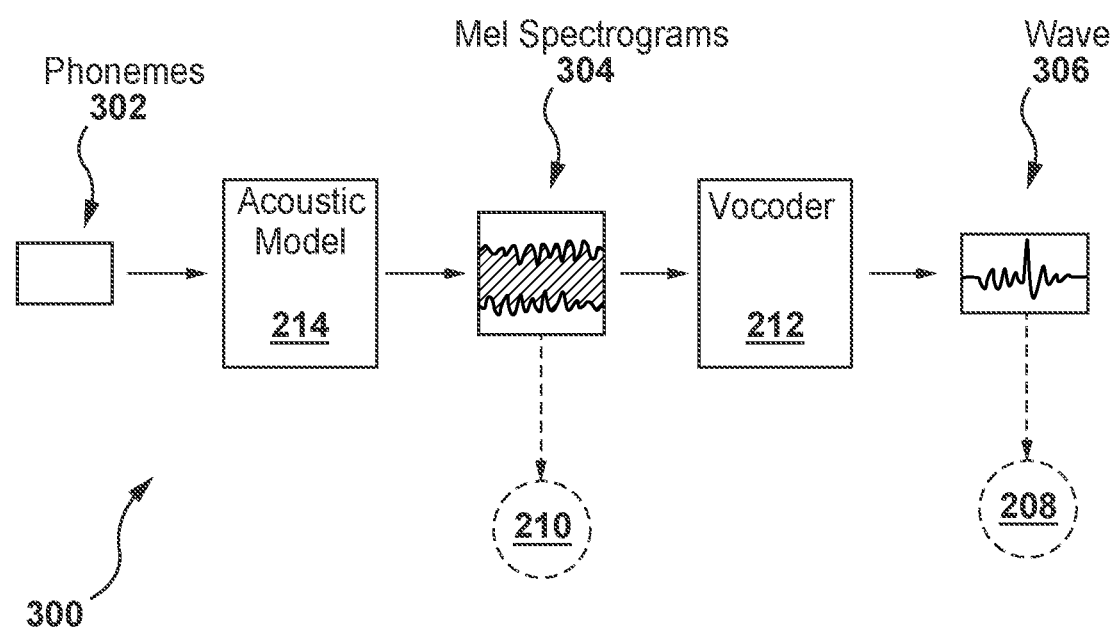
FIG. 3 depicts a processing pipeline performed by the server, for generating the modified audio based on phonemes, in accordance with at least some embodiments of the present technology.

In some embodiments, the alignment operation 208 may be performed on time-domain waveform signals generated by the vocoder 212. In other embodiments, the alignment operation 210 may be performed on mel-spectrograms generated by the acoustic model 214. For example, with reference to FIG. 3, there is depicted a processing pipeline 300 executed by the server 112. The server 112 is configured to provide generated phonemes 302 into the acoustic model 214. The acoustic model 214 is configured to generate MEL spectrograms 304 representative of the phonemes 302. The server 112 is configured to input the MEL spectrograms 304 into the vocoder 212 for generating waveform signals 306. In some embodiments, the server 112 is configured to execute the alignment operation 210 on the MEL spectrograms 304 generated by the acoustic model 214. In other embodiments, however, the server 112 may be configured to execute the alignment operation 208 on the waveform signals 254. How the server 112 is configured to execute the alignment operation 208 and/or the alignment operation 210 will now be described in greater details.

Figure 4:
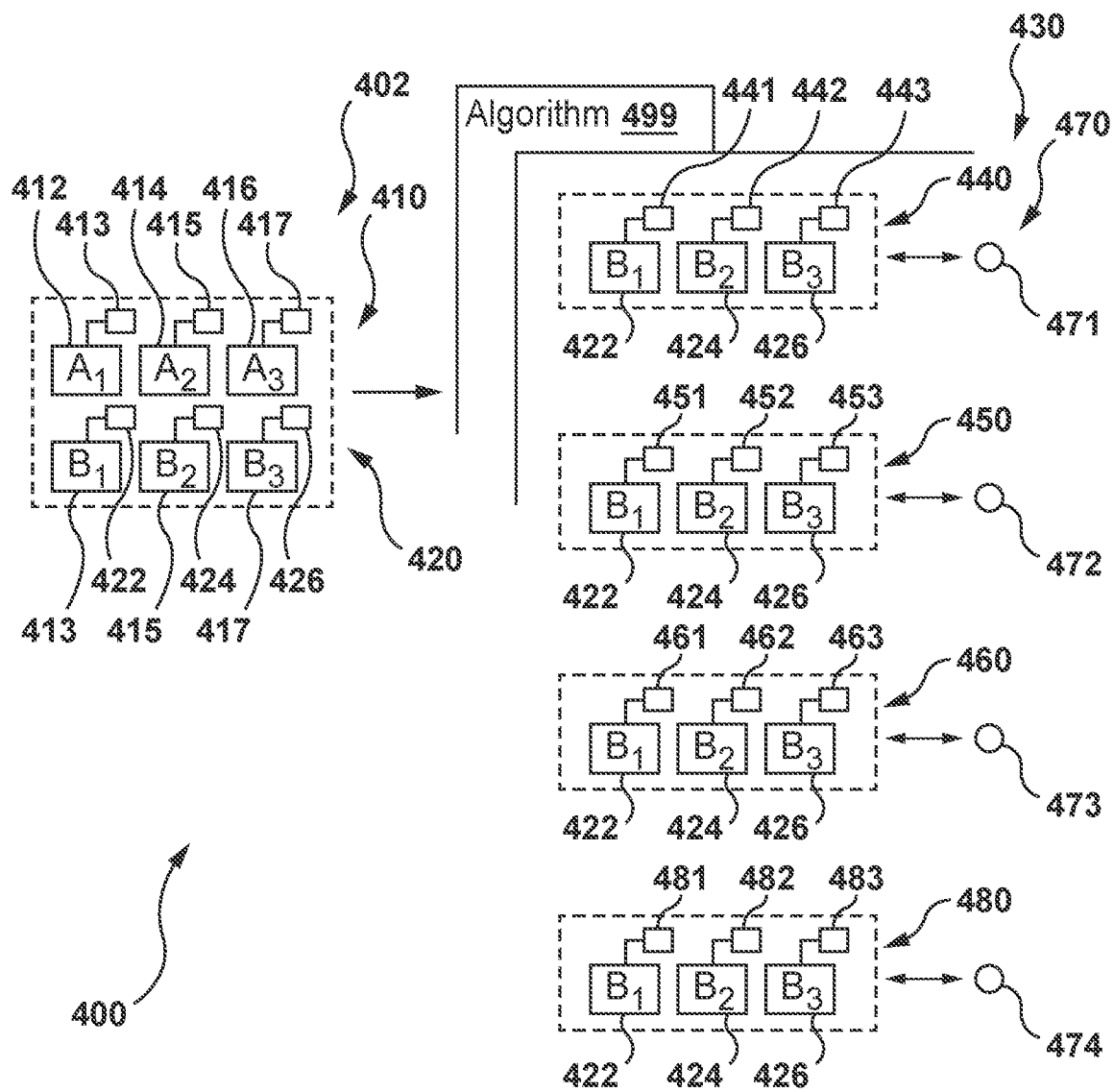
FIG. 4 depicts an input set comprising a sequence of first audio portions and a sequence of second audio portions, and a plurality of candidate arrangements for the sequence of second audio portions, in accordance with at least some embodiments of the present technology.

With reference to FIG. 4, there is depicted a representation 400 of how the server 112 is configured to generate the modified audio portions. The server 112 is configured to acquire an input set 402 comprising a sequence of first audio portions 410 and a sequence of second audio portions 420.

In some embodiments, the sequence of first audio portions 410 may be a sequence of first MEL spectrograms and the sequence of second audio portions 420 may be a sequence of second MEL spectrograms. In these embodiments the server 112 is configured to execute the alignment operation 210. In other embodiments, the sequence of first audio portions 410 may be a sequence of first waveform signals and the sequence of second audio portions 420 may be a sequence of second waveform signals. In these other embodiments the server 112 is configured to execute the alignment operation 208.

It should be noted that a given one of the sequence of first audio portions 410 is representative of a given sentence in a first language. As such the sequence of first audio portions 410 comprises first audio portions 412, 414, and 416 which are representative of three sequential sentences in the first language. Each of the sequence of first audio portions 410 is associated with timestamp data. For example, the first audio portion 412 is associated with temporal data 413, the first audio portion 414 is associated with temporal data 415, and the first audio portion 416 is associated with temporal data 417. The temporal data 413 may comprise a start timestamp and an end timestamp of the first audio portion 412 in the video file. The temporal data 415 may comprise a start timestamp and an end timestamp of the first audio portion 414 in the video file. The temporal data 417 may comprise a start timestamp and an end timestamp of the first audio portion 416 in the video file.

It should be noted that a given one of the sequence of second audio portions 420 is representative of a given sentence in a second language. As such the sequence of second audio portions 420 comprises second audio portions 422, 424, and 426 which are representative of three sequential sentences in the second language and which are respective translations of the three sequential sentences in the first language represented by the first audio portions 412, 414, and 416.

Each of the sequence of second audio portions 420 is associated with timestamp data. For example, the second audio portion 422 is associated with temporal data 423, the second audio portion 424 is associated with temporal data 425, and the second audio portion 426 is associated with temporal data 427. The temporal data 423 may comprise a time length of the second audio portion 422. The temporal data 425 may comprise a time length of the second audio portion 424. The temporal data 427 may comprise a time length of the second audio portion 426. It is contemplated that in those embodiments where the second audio portions are respective MEL spectrograms, the time length may be extracted from the respective MEL spectrogram. In those embodiments where the second audio portions are respective waveform signals, the time length may correspond to the time length of the respective waveform signal.

Figure 5:
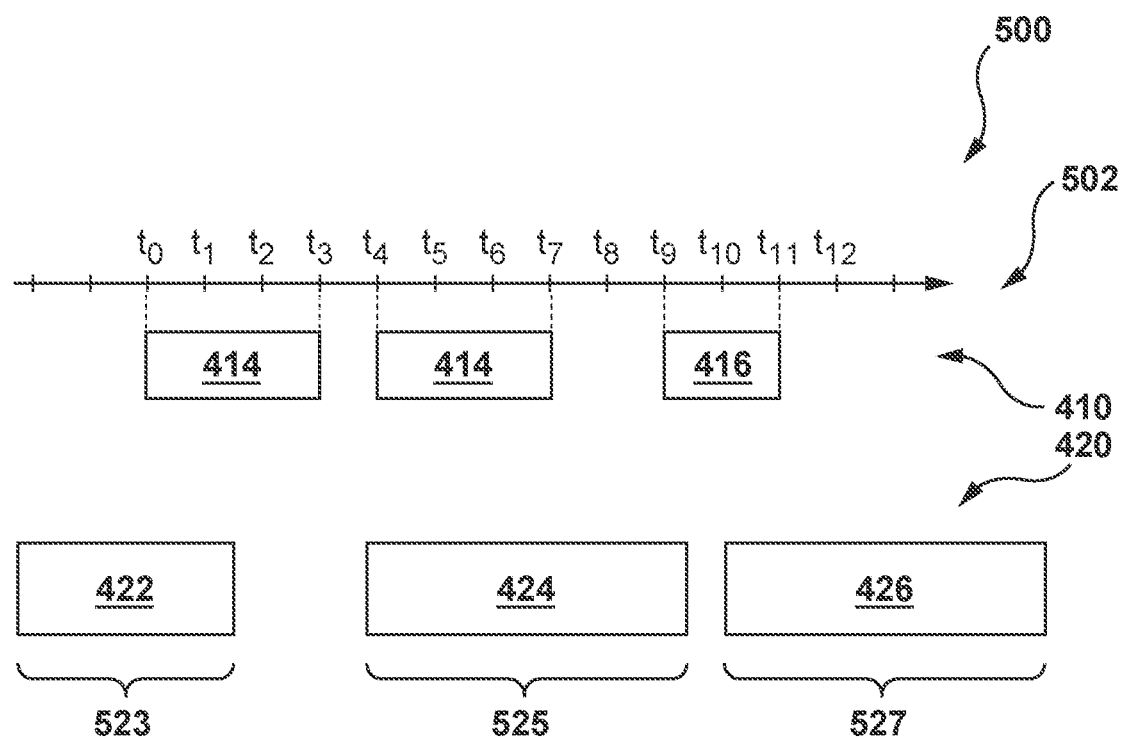
FIG. 5 is a schematical representation of the sequence of first audio portions and the sequence of second audio portions from FIG. 4.

With a brief reference to FIG. 5, there is depicted a timeline 502 associated with the video file. The first audio portion 412 is associated with a start timestamp t0 and an end timestamp t3, the first audio portion 414 is associated with a start timestamp t4 and an end timestamp t7, and the first audio portion 416 is associated with a start timestamp t9 and an end timestamp t11. There is also depicted the second audio portion 422 having a time length 523, the second audio portion 424 having a time length 525, and the second audio portion 426 having a time length 527.

The server 112 is configured to provide the input set 402 to the computer-implemented algorithm 499. The algorithm 499 may be configured to operate using a dynamic programming technique. Broadly speaking, dynamic programming techniques refer to techniques that are used to simplify a complicated problem by breaking it down into simpler sub-problems in a recursive manner. While some decision problems cannot be taken apart this way, decisions that span several points in time do often break apart recursively. Likewise, in computer science, if a problem can be solved optimally by breaking it into sub-problems and then recursively finding the optimal solutions to the sub-problems, then it is said to have optimal substructure. In the context of the present technology, the server 112 is configured to perform a dynamic programming technique for selecting a target arrangement of the sequence of second audio portions 420 amongst a plurality of candidate arrangements 430 thereof.

The plurality of candidate arrangements 430 comprises a first candidate arrangement 440, a second candidate arrangement 450, and a third candidate arrangement 460, and a fourth candidate arrangement 480. The first candidate arrangement 440 comprises the second audio portion 422 associated with candidate arrangement data 441, the second audio portion 424 associated with candidate arrangement data 442, and the second audio portion 426 associated with candidate arrangement data 444. The second candidate arrangement 450 comprises the second audio portion 424 associated with candidate arrangement data 451, the second audio portion 424 associated with candidate arrangement data 452, and the second audio portion 426 associated with candidate arrangement data 454. The third candidate arrangement 460 comprises the second audio portion 422 associated with candidate arrangement data 461, the second audio portion 424 associated with candidate arrangement data 462, and the second audio portion 426 associated with candidate arrangement data 464. The fourth candidate arrangement 480 comprises the second audio portion 422 associated with candidate arrangement data 481, the second audio portion 424 associated with candidate arrangement data 482, and the second audio portion 426 associated with candidate arrangement data 484. It should be noted that candidate arrangement data associated with a given second audio portion may comprise a candidate start timestamp of the given second audio portion in the video file and a candidate compression factor of the given second audio portion.

The server 112 is configured to generate a plurality of penalty scores 470 for the plurality of candidate arrangements 430. The server 112 is configured to generate a first penalty score 471 for the first candidate arrangement 440, a second penalty score 472 for the second candidate arrangement 450, a third penalty score 473 for the third candidate arrangement 460. A given penalty score is generated based on (i) the temporal data associated with the sequence of first audio portions 410, (ii) temporal data associated with the sequence of second audio portion 420, and (ii) candidate arrangement data associated with second audio portions in a corresponding candidate arrangement. The server 112 is configured to select a given one amongst the plurality of candidate arrangements 430 as the target arrangement for the sequence of second audio portions 420 based on the plurality of penalty scores 470. For example, the server 112 may select the third candidate arrangement 460 as the target arrangement if the third penalty score 473 is a minimal penalty score amongst the plurality of penalty scores 470. How the server 112 is configured to generate a given penalty score for a corresponding candidate arrangement will now be described in greater details.

Figure 6:
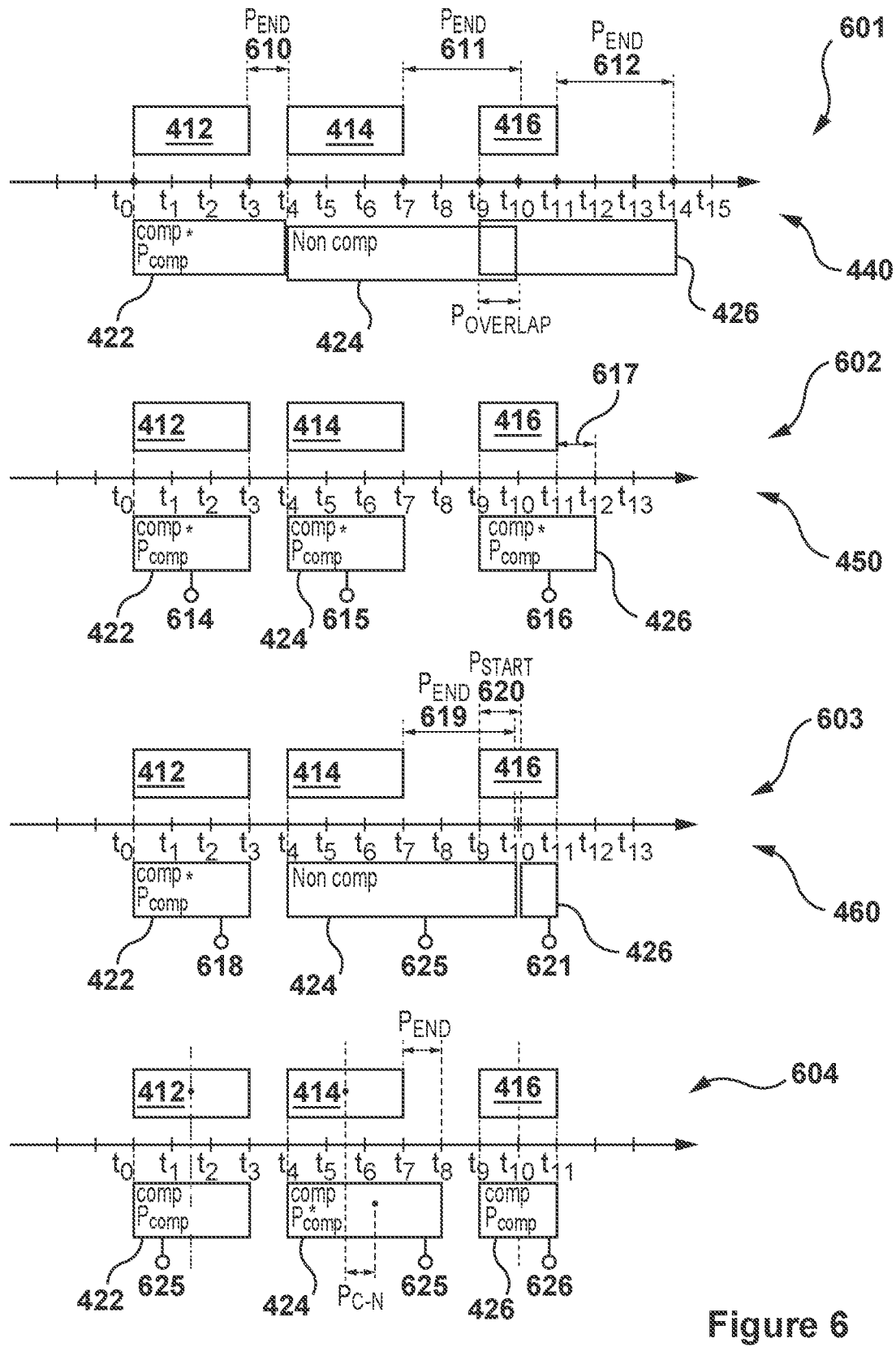
FIG. 6 is a schematical representation of penalty scores for respective ones from the plurality of candidate arrangements from FIG. 4.

With reference to FIG. 6, there is depicted representations 601, 602, 603, and 604, of the respective candidate arrangements 440, 450, 460, and 480.

The candidate arrangement data 441 is indicative of a start timestamp t0 and a compression factor of "1" for the second audio portion 422. The candidate arrangement data 442 is indicative of a start timestamp t4 and a compression factor of "1" for the second audio portion 424. The candidate arrangement data 443 is indicative of a start timestamp t9 and a compression factor of "1" for the second audio portion 426. The compression factor of "1" is indicative that a corresponding second audio portion has its respective original time length in the respective candidate arrangement.

In some embodiments, the server 112 may be configured to generate penalty values 610 to 613. The penalty value 610 may be indicative of a difference between the end timestamp t3 for the first audio portion 412 and the end timestamp t4 for the second audio portion 422 in the candidate arrangement 440. The penalty value 611 may be indicative of a difference between the end timestamp t7 for the first audio portion 414 and the end timestamp t10 for the second audio portion 424 in the candidate arrangement 440. The penalty value 612 may be indicative of a difference between the end timestamp t11 for the first audio portion 416 and the end timestamp t14 for the second audio portion 426 in the candidate arrangement 440. The penalty value 613 may be indicative of an overlap between the second audio portion 424 and the second audio portion 426 in the candidate arrangement 440. In some embodiments, the penalty value 613 may be a pre-determined penalty score attributed to a candidate arrangement if an overlap is determined. In other embodiments, the penalty value 613 may be proportional to an amount of overlap in a given candidate arrangement. The server 112 may generate the penalty score 471 for the candidate arrangement 440 as a combination of the penalty values 610 to 613.

The candidate arrangement data 451 is indicative of a start timestamp t0 and a compression factor of larger than "1" for the second audio portion 422. The candidate arrangement data 452 is indicative of a start timestamp t4 and a compression factor of larger than "1" for the second audio portion 424. The candidate arrangement data 453 is indicative of a start timestamp t9 and a compression factor of larger than "1" for the second audio portion 426. The compression factor of larger than "1" is indicative that a corresponding second audio portion has a shorter time length than the respective original time length in the respective candidate arrangement.

In some embodiments, the server 112 may be configured to generate penalty values 614 to 617. The penalty value 614 may be indicative of a compression rate for the second audio portion 422 in the candidate arrangement 450. The penalty value 615 may be indicative of a compression rate for the second audio portion 424 in the candidate arrangement 450. The penalty value 616 may be indicative of a compression rate for the second audio portion 426 in the candidate arrangement 450. The penalty value 617 may be indicative of a difference between the end timestamp t11 for the first audio portion 416 and the end timestamp t12 for the second audio portion 426 in the candidate arrangement 450. The server 112 may generate the penalty score 472 for the candidate arrangement 450 as a combination of the penalty values 614 to 617.

The candidate arrangement data 461 is indicative of a start timestamp t0 and a compression factor of larger than "1" for the second audio portion 422. The candidate arrangement data 462 is indicative of a start timestamp t4 and a compression factor of "1" for the second audio portion 424. The candidate arrangement data 463 is indicative of a start timestamp t10 and a compression factor of larger than "1" for the second audio portion 426.

In some embodiments, the server 112 may be configured to generate penalty values 618 to 621. The penalty value 618 may be indicative of a compression rate of the second audio portion 422 in the candidate arrangement 460. The penalty value 619 may be indicative of a difference between the end timestamp t7 for the first audio portion 414 and the end timestamp t10 for the second audio portion 424 in the candidate arrangement 460. The penalty value 620 may be indicative of a difference between the start timestamp t9 for the first audio portion 416 and the end timestamp t10 for the second audio portion 426 in the candidate arrangement 460. The penalty value 621 may be indicative of a compression rate of the second audio portion 426 in the candidate arrangement 460. The server 112 may generate the penalty score 473 for the candidate arrangement 460 as a combination of the penalty values 618 to 621.

The candidate arrangement data 481 is indicative of a start timestamp t0 and a compression factor of larger than "1" for the second audio portion 422. The candidate arrangement data 482 is indicative of a start timestamp t4 and a compression factor of larger than "1" for the second audio portion 424. The candidate arrangement data 483 is indicative of a start timestamp t9 and a compression factor of larger than "1" for the second audio portion 426.

In some embodiments, the server 112 may be configured to generate penalty values 622 to 626. The penalty value 622 may be indicative of a compression rate for the second audio portion 422 in the candidate arrangement 480. The penalty value 622 may be indicative of a different between a center timestamp of the first audio portion 414 and a center timestamp of the second audio portion 424 in the candidate arrangement 480. The penalty value 624 may be indicative of a different between the end timestamp t7 of the first audio portion 414 and the end timestamp t8 of the second audio portion 424 in the candidate arrangement 480. The penalty value 625 may be indicative of a compression rate for the second audio portion 424 in the candidate arrangement 480. The penalty value 626 may be indicative of a compression rate for the second audio portion 426 in the candidate arrangement 480. The server 112 may generate the penalty score 474 for the candidate arrangement 480 as a combination of the penalty values 622 to 626.

It is contemplated that the server 112 may be configured to generate a variety of penalty values to be used in combination for determining a penalty score for a given candidate arrangement of second audio portions. For example, a given penalty score may be indicative of a difference between start timestamps of a first audio portion and a corresponding second audio portion in a given candidate arrangement. In another example, a given penalty score may be indicative of a difference between end timestamps of a first audio portion and a corresponding second audio portion in a given candidate arrangement. In a further example, a given penalty score may be indicative of a difference between center timestamps of a first audio portion and a corresponding second audio portion in a given candidate arrangement. In an additional example, a given penalty score may be indicative of an overlap between a pair of second audio portion in a given candidate arrangement. For example, a given penalty score may be indicative of a compression rate of a second audio portion in a given candidate arrangement.

It is contemplated that the server 112 may be configured to select a target arrangement for the sequence of second audio portions 420 amongst the candidate arrangements 440, 450, 460, and 480 based on the plurality penalty scores 470. For example, the server 112 may select the target arrangement as the candidate arrangement with a minimal penalty score amongst the plurality penalty scores 470.

Figure 7:
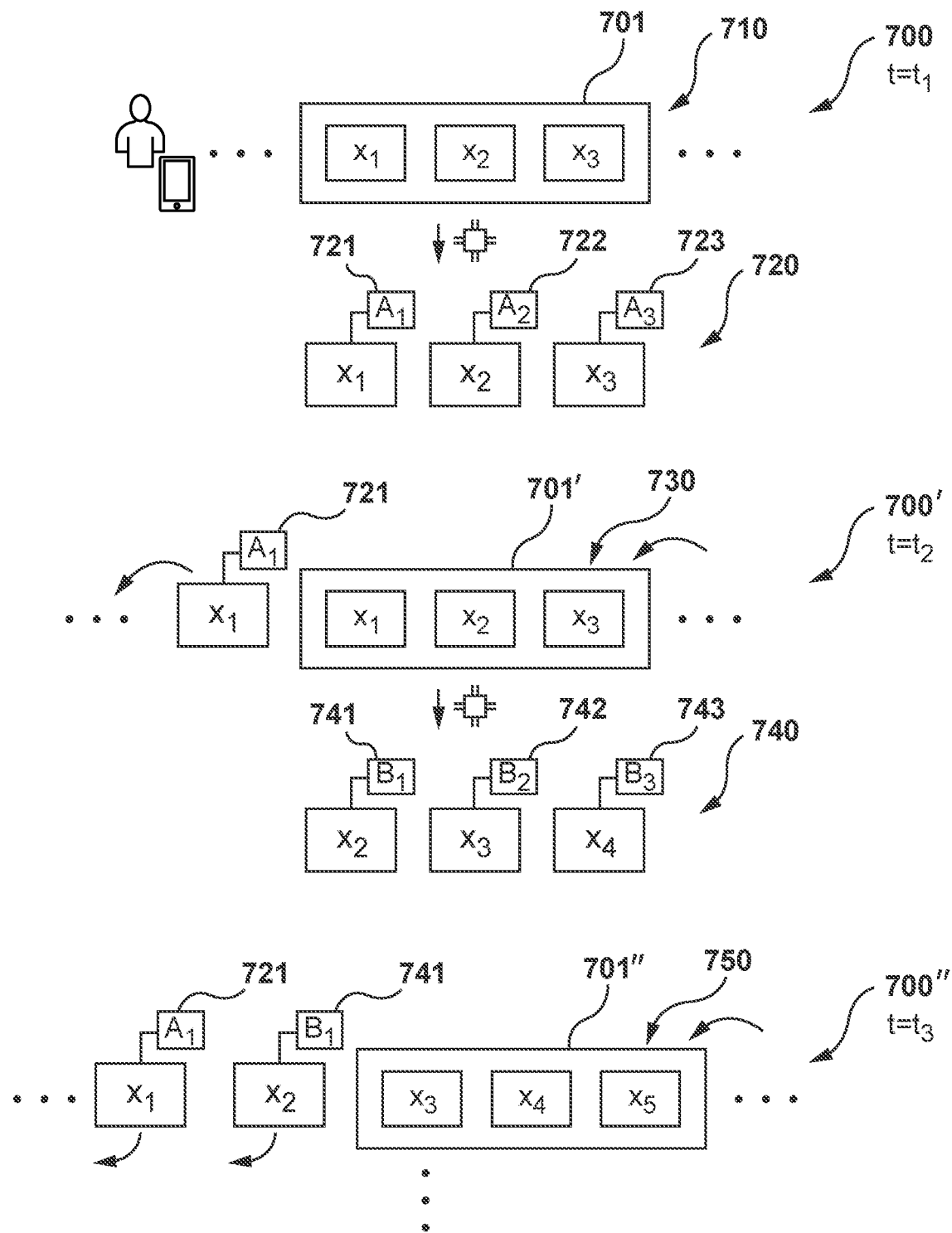
FIG. 7 is a schematic representation of a generation of modified audio portions in a streaming mode.

With reference to FIG. 7, there is depicted a non-limiting embodiment of the present technology where the server 112 is operating in a streaming mode. There are depicted three states of a streaming pipeline of second audio portions to be modified by the server 112, The modified second audio portions are to be provided to the user 102 in the streaming mode. The streaming pipeline is illustrated in a first state 700 at t=t1, in a second state 700' at t=t2, and in a third state 70" at t=t3.

In the first state 700, at t=t1, the server 112 may employ a sliding window 701 for selecting a current sequence of second audio portions 710 including second audio portions x1, x2, and x3. The server 112 is configured to select a target arrangement 720 of the current sequence of second audio portions 710 similarly to how the server 112 is configured to select the target arrangement amongst the candidate arrangements 440, 450, 460, and 480. In the target arrangement 720, the second audio portion x1 is associated target arrangement data 721, the second audio portion x2 is associated target arrangement data 722, and the second audio portion x3 is associated target arrangement data 723. In this embodiment, the server 112 is configured to modify the first one from the sequence of second audio portions 710, x1, in accordance with the target arrangement data 721. The so-modified second audio portion x1 is provided to the electronic device 104 in combination with the streaming video content.

In the second state 700', at t=t2, the server 112 acquires a new second audio portion x4 and may employ a sliding window 701' for selecting a current sequence of second audio portions 730 including second audio portions x2, x3, and x4. The server 112 is configured to select a target arrangement 740 of the current sequence of second audio portions 730 similarly to how the server 112 is configured to select the target arrangement amongst the candidate arrangements 440, 450, 460, and 480. In the target arrangement 740, the second audio portion x2 is associated target arrangement data 741, the second audio portion x3 is associated target arrangement data 742, and the second audio portion x4 is associated target arrangement data 743. In this embodiment, the server 112 is configured to modify the first one from the current sequence of second audio portions 730, x2, in accordance with the target arrangement data 741. The so-modified second audio portion x2 is provided to the electronic device 104 in combination with the streaming video content.

Figure 8:
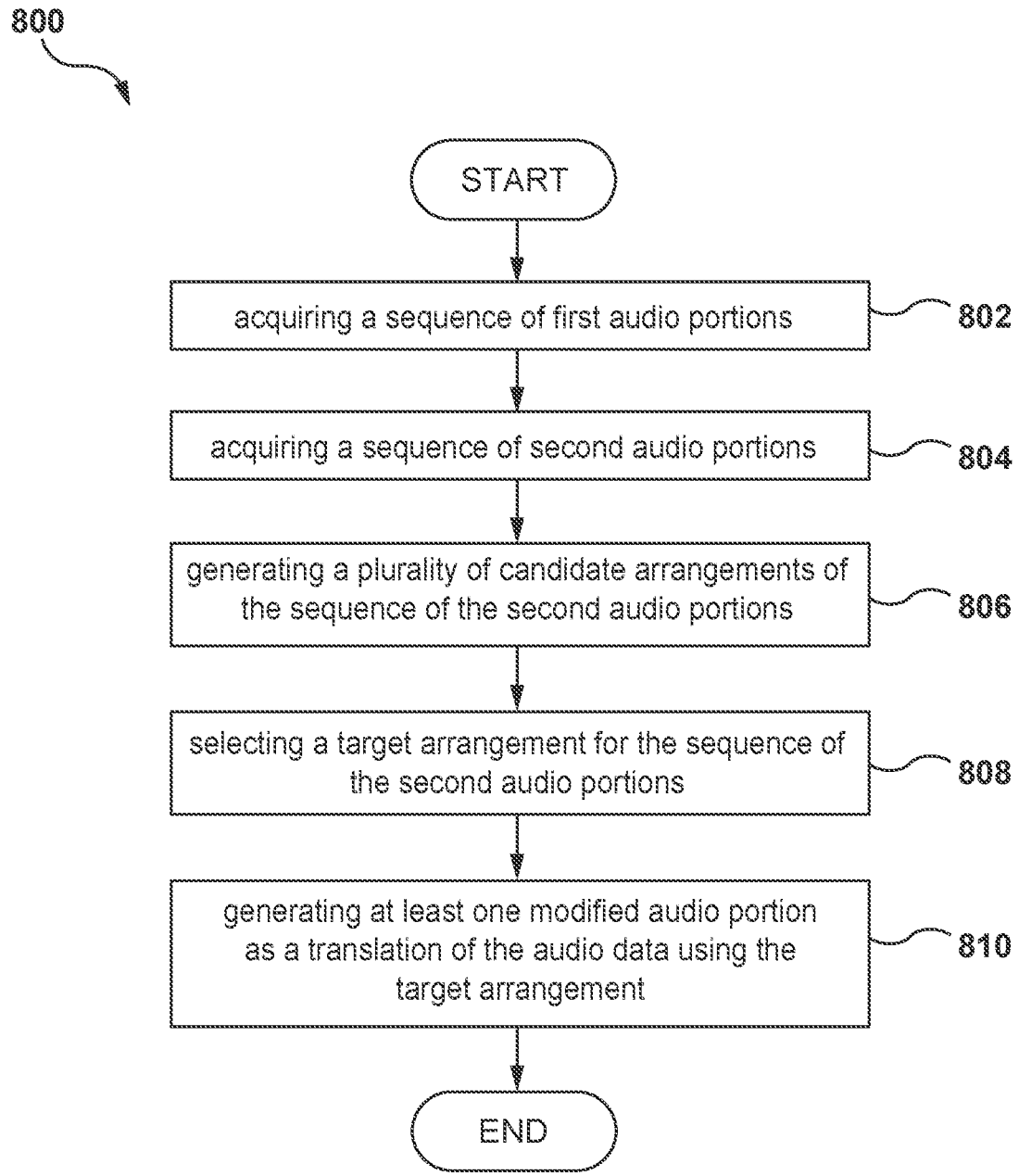
FIG. 8 is a schematic flowchart of a method executable in accordance with certain non-limiting embodiments of the present technology.

In some embodiments of the present technology, the server 112 is configured to execute a method 800 illustrated in FIG. 8. Various steps of the method 800 will now be discussed in greater details.

Step 802: Acquiring a Sequence of First Audio Portions

The method 800 begins at step 802 with the server 112 configured to acquire a sequence of first audio portions. A given one from the sequence of first audio portions is representative of a given sentence in a first language and being associated with a timestamp in the video file.

For example, the server 112 is configured to acquire an input set 402 comprising the sequence of first audio portions 410. In some embodiments, the sequence of first audio portions 410 may be a sequence of first MEL spectrograms. In these embodiments the server 112 is configured to execute the alignment operation 210. In other embodiments, the sequence of first audio portions 410 may be a sequence of first waveform signals. In these other embodiments the server 112 is configured to execute the alignment operation 208.

It should be noted that a given one of the sequence of first audio portions 410 is representative of a given sentence in a first language. As such the sequence of first audio portions 410 comprises first audio portions 412, 414, and 416 which are representative of three sequential sentences in the first language. Each of the sequence of first audio portions 410 is associated with timestamp data.

Step 804: Acquiring a Sequence of Second Audio Portions

The method continues to step 804 with the server 112 configured to acquire a sequence of second audio portions. A given one from the sequence of second audio portions is representative of an other given sentence in a second language and is associated with a time length. The other given sentence being a translation of the given sentence.

For example, a given one of the sequence of second audio portions 420 is representative of a given sentence in a second language. As such the sequence of second audio portions 420 comprises second audio portions 422, 424, and 426 which are representative of three sequential sentences in the second language and which are respective translations of the three sequential sentences in the first language represented by the first audio portions 412, 414, and 416.

It is contemplated that the server 112 may be configured to generate the sequence of second audio portions 420 based on the sequence of first audio portions 410 using one or more machine learning models as described above.

Step 806: Generating a Plurality of Candidate Arrangements of the Sequence of the Second Audio Portions The method 800 continues to step 806 with the server 112 configured to generate a plurality of candidate arrangements of the sequence of the second audio portions. A given candidate arrangement is associated with candidate timestamps in the video file and candidate compression rates for respective ones from the sequence of second audio portions.

For example, the plurality of candidate arrangements 430 comprises the first candidate arrangement 440, he second candidate arrangement 450, and the third candidate arrangement 460, and the fourth candidate arrangement 480.

The first candidate arrangement 440 comprises the second audio portion 422 associated with candidate arrangement data 441, the second audio portion 424 associated with candidate arrangement data 442, and the second audio portion 426 associated with candidate arrangement data 444.

The second candidate arrangement 450 comprises the second audio portion 424 associated with candidate arrangement data 451, the second audio portion 424 associated with candidate arrangement data 452, and the second audio portion 426 associated with candidate arrangement data 454.

The third candidate arrangement 460 comprises the second audio portion 422 associated with candidate arrangement data 461, the second audio portion 424 associated with candidate arrangement data 462, and the second audio portion 426 associated with candidate arrangement data 464.

The fourth candidate arrangement 480 comprises the second audio portion 422 associated with candidate arrangement data 481, the second audio portion 424 associated with candidate arrangement data 482, and the second audio portion 426 associated with candidate arrangement data 484.

It should be noted that candidate arrangement data associated with a given second audio portion may comprise a candidate start timestamp of the given second audio portion in the video file and a candidate compression factor of the given second audio portion.

Step 808: Selecting a Target Arrangement for the Sequence of the Second Audio Portions The method continues to step 808 with the server 112 configured to select a target arrangement for the sequence of the second audio portions from the plurality of candidate arrangements. The server 112 is configured to select the target arrangement based on the target arrangement having a minimal penalty score amongst penalty scores associated with respective ones from the plurality of candidate arrangements.

For example, the server 112 may be configured to generate the plurality of penalty scores 470 for the plurality of candidate arrangements 430. The server 112 is configured to generate the first penalty score 471 for the first candidate arrangement 440, the second penalty score 472 for the second candidate arrangement 450, the third penalty score 473 for the third candidate arrangement 460, and the fourth penalty score 474 for the fourth candidate arrangement 480.

A given penalty score can be generated based on (i) the temporal data associated with the sequence of first audio portions 410, (ii) temporal data associated with the sequence of second audio portion 420, and (ii) candidate arrangement data associated with second audio portions in a corresponding candidate arrangement.

In some embodiments, the server may be configured to select a given one amongst the plurality of candidate arrangements 430 as the target arrangement for the sequence of second audio portions 420 based on the plurality of penalty scores 470. For example, the server 112 may select the third candidate arrangement 460 as the target arrangement if the third penalty score 473 is a minimal penalty score amongst the plurality of penalty scores 470.

It should be noted that how the penalty score can be generated in different manners. For example, a given penalty score for a given candidate arrangement may be generated based on: (i) a combination of differences between timestamps associated with respective ones from the sequence of first audio portions and corresponding ones from the given candidate arrangement, (ii) a presence of overlap between a given pair of second audio portions if: the second audio portions from the sequence of second audio portions are arranged in the video file in accordance with the candidate timestamps and the candidate compression rates.

In other embodiments, the given penalty score may be generated by the server 112 based on: a combination of differences between start timestamps associated with respective ones from the sequence of first audio portions and corresponding candidate start timestamps from the given candidate arrangement, and a combination of differences between end timestamps associated with respective ones from the sequence of first audio portions and corresponding end timestamps from the given candidate arrangement.

In further embodiments, the given penalty score may be generated by the server 112 based on a combination of differences between center timestamps associated with respective ones from the sequence of first audio portions and corresponding candidate center timestamps from the given candidate arrangement. In additional embodiments, the penalty score may be generated by the server 112 based on a combination of candidate compression rates of the given candidate arrangement.

It is contemplated that a given penalty score may be generated as a combination of penalty values. A given penalty value may be embodied as one of the penalty values 610 to 626 described above with reference to FIG. 6. It is contemplated that the combination of penalty values may be weighted so that a first type of penalty values may contribute more than a second type of penalty values to the given penalty score.

Step 810: Generating at Least One Modified Audio Portion as a Translation of the Audio Data Using the Target Arrangement The method 800 continues to step 810 with the server 112 configured to generate at least one modified audio portion for the video file as a translation of the audio data using the target arrangement.

It is contemplated that the server 112 may be configured to generate the at least one modified audio portion in an offline mode. For example, the translation of the audio data may be generated by the server 112 and stored with the video file in a storage for future provision thereof to users of the server 112. In these embodiments, the server 112 may be configured to generate modified audio portions for each second audio portion generated from the original audio data of the video file. Alternatively, only portions of the original audio data may be translated and corresponding modified audio portions may be generated by the server 112 and stored in associated with the video file in the storage.

In other embodiments, the server 112 may be configured to generate the at least one modified audio portion in a streaming mode, where the video and audio data is streamed to the electronic device 104. In these embodiments, the at least one modified audio portion may be a first one from the sequence of second audio portions that has been modified in accordance with the target arrangement data for the first one from the sequence of second audio portions. This modified audio portion may be transmitted to the electronic device 104 as part of the streaming data.

The server 112 may also be configured to a new first audio portion representative of an additional sentence in the first language. The server 112 may also acquire new second audio portion representative of an other additional sentence in a second language. The other additional sentence is a translation of the additional sentence. The new second audio portion and a subset of second audio portions from the sequence of second audio portions form a new sequence of second audio portions. The subset of second audio portions excludes a first one from the sequence of second audio portions having been used to generate the at least one modified portion.

For example, the server 112 may employ the sliding window 701 for selecting a current sequence of second audio portions 710 including the second audio portions x1, x2, and x3. The server 112 is configured to select the target arrangement 720 of the current sequence of second audio portions 710. In the target arrangement 720, the second audio portion x1 is associated target arrangement data 721. The server 112 may be configured to modify the first one from the sequence of second audio portions 710, x1, in accordance with the target arrangement data 721. The so-modified second audio portion x1 is provided to the electronic device 104 in combination with the streaming video content.

In the same example, the server 112 may acquire the new second audio portion x4 and may employ the sliding window 701' for selecting the current sequence of second audio portions 730 including second audio portions x2, x3, and x4. The server 112 is configured to select a target arrangement 740 of the current sequence of second audio portions 730. In the target arrangement 740, the second audio portion x2 is associated target arrangement data 741. The server 112 may be configured to modify the first one from the current sequence of second audio portions 730, x2, in accordance with the target arrangement data 741. The so-modified second audio portion x2 is provided to the electronic device 104 in combination with the streaming video content.

Hence, it can be said that the server 112 may generate a new plurality of candidate arrangements for the new sequence of the second audio portions, and select a new target arrangement for the new sequence of the second audio portions from the new plurality of candidate arrangements. The server 112 may then generate a new modified audio portion by modifying a first one from the new sequence of second audio portions in accordance with the new target arrangement. The server 112 may then transmit an other portion of the video file with the new modified audio portion to the user device.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of generating modified audio data for a video file, the video file being associated with audio data, the method executable by a server, the method comprising:
   acquiring, by the server, a sequence of first audio portions,
      a given one from the sequence of first audio portions being representative of a given sentence in a first language and being associated with a timestamp in the video file;
   acquiring, by the server, a sequence of second audio portions,
      a given one from the sequence of second audio portions being representative of an other given sentence in a second language and being associated with a time length, the other given sentence being a translation of the given sentence;

generating, by the server, a plurality of candidate arrangements of the sequence of the second audio portions,
a given candidate arrangement being associated with candidate timestamps in the video file and candidate compression rates for respective ones from the sequence of second audio portions;
selecting a target arrangement for the sequence of the second audio portions from the plurality of candidate arrangements, the selecting being based on the target arrangement having a minimal penalty score amongst penalty scores associated with respective ones from the plurality of candidate arrangements, a given penalty score of the given candidate arrangement being generated based on:
(i) a combination of differences between timestamps associated with respective ones from the sequence of first audio portions and corresponding ones from the given candidate arrangement,
(ii) a presence of overlap between a given pair of second audio portions if: the second audio portions from the sequence of second audio portions are arranged in the video file in accordance with the candidate timestamps and the candidate compression rates; and
generating at least one modified audio portion for the video file as a translation of the audio data using the target arrangement.

2. The method of claim 1, wherein the given one from the sequence of first audio portions is a waveform audio signal.

3. The method of claim 1, wherein the given one from the sequence of first audio portions is a mel-spectrogram.

4. The method of claim 1, wherein the method further comprises generating, by the server, the sequence of second audio portions based on the sequence of first audio portions.

5. The method of claim 1, wherein the timestamp associated with the given one from the sequence of first audio portions is a start timestamp, and wherein the given one from the sequence of first audio portions is further associated with an end timestamp in the video file, the candidate timestamps of the given candidate arrangement including candidate start timestamps and candidate end timestamps for respective second audio portions from the given candidate arrangement, the given penalty score being further generated based on:
a combination of differences between start timestamps associated with respective ones from the sequence of first audio portions and corresponding candidate start timestamps from the given candidate arrangement,
a combination of differences between end timestamps associated with respective ones from the sequence of first audio portions and corresponding end timestamps from the given candidate arrangement.

6. The method of claim 1, wherein the timestamp associated with the given one from the sequence of first audio portions is a center timestamp, the candidate timestamps of the given candidate arrangement including candidate center timestamps for respective second audio portions from the given candidate arrangement, the given penalty score being further generated based on:
a combination of differences between center timestamps associated with respective ones from the sequence of first audio portions and corresponding candidate center timestamps from the given candidate arrangement.

7. The method of claim 1, wherein the penalty score is further generated based on a combination of candidate compression rates of the given candidate arrangement.

8. The method of claim 1, wherein the generating the at least one modified audio portion is executed by the server in an off-line mode and wherein the method further comprises storing, by the server, the video file with the at least one modified audio portion in a storage.

9. The method of claim 1, wherein the generating the at least one modified audio portion is executed by the server in a streaming mode and wherein the method further comprises transmitting, by the server, a video portion of the video file with the at least one modified audio portion to a user device.

10. The method of claim 9, wherein the method further comprises:
acquiring, by the server, a new first audio portion being representative of an additional sentence in the first language;
acquiring, by the server, a new second audio portion being representative of an other additional sentence in a second language, the other additional sentence being a translation of the additional sentence,
the new second audio portion and a subset of second audio portions from the sequence of second audio portions forming a new sequence of second audio portions,
the subset of second audio portions excluding a first one from the sequence of second audio portions having been used to generate the at least one modified portion;
generating, by the server, a new plurality of candidate arrangements for the new sequence of the second audio portions,
selecting, by the server, a new target arrangement for the new sequence of the second audio portions from the new plurality of candidate arrangements;
generating, by the server, a new modified audio portion by modifying a first one from the new sequence of second audio portions in accordance with the new target arrangement; and
transmitting, by the server, an other portion of the video file with the new modified audio portion to the user device.

11. A server for generating modified audio data for a video file, the video file being associated with audio data, the server being configured to:
acquire a sequence of first audio portions,
a given one from the sequence of first audio portions being representative of a given sentence in a first language and being associated with a timestamp in the video file;
acquire a sequence of second audio portions,
a given one from the sequence of second audio portions being representative of an other given sentence in a second language and being associated with a time length, the other given sentence being a translation of the given sentence;
generate a plurality of candidate arrangements for the sequence of the second audio portions,
a given candidate arrangement being associated with candidate timestamps in the video file and candidate compression rates for respective ones from the sequence of second audio portions;
select a target arrangement for the sequence of the second audio portions from the plurality of candidate arrangements,
the server being configured to select based on the target arrangement having a minimal penalty score amongst penalty scores associated with respective ones from the plurality of candidate arrangements, a given penalty score of the given candidate arrangement being generated based on:
- (i) differences between timestamps associated with respective ones from the sequence of first audio portions and corresponding ones from the given candidate arrangement, and
- (ii) a presence of overlap between a given pair of second audio portions if: the second audio portions from the sequence of second audio portions are arranged in the video file in accordance with the candidate timestamps and the candidate compression rates; and generate at least one modified audio portion for the video file as a translation of the audio data using the target arrangement.

12. The server of claim 11, wherein the given one from the sequence of first audio portions is a waveform audio signal.

13. The server of claim 11, wherein the given one from the sequence of first audio portions is a mel-spectrogram.

14. The server of claim 11, wherein the server is further configured to generate the sequence of second audio portions based on the sequence of first audio portions.

15. The server of claim 11, wherein the timestamp associated with the given one from the sequence of first audio portions is a start timestamp, and the given one from the sequence of first audio portions is further associated with an end timestamp in the video file,
the candidate timestamps of the given candidate arrangement including candidate start timestamps and candidate end timestamps for respective second audio portions, the given penalty score being further generated based on:
a combination of differences between start timestamps associated with respective ones from the sequence of first audio portions and corresponding candidate start timestamps from the given candidate arrangement,
a combination of differences between end timestamps associated with respective ones from the sequence of first audio portions and corresponding end timestamps from the given candidate arrangement.

16. The server of claim 11, wherein the timestamp associated with the given one from the sequence of first audio portions is a center timestamp, the candidate timestamps of the given candidate arrangement including candidate center timestamps for respective second audio portions, the given penalty score being further generated based on:
a combination of differences between center timestamps associated with respective ones from the sequence of first audio portions and corresponding candidate center timestamps from the given candidate arrangement.

17. The server of claim 11, wherein the penalty score is further generated based on a combination of candidate compression rates of the given candidate arrangement.

18. The server of claim 11, wherein the server is configured to generate the at least one modified audio portion in an off-line mode and further configured to store the video file with the at least one modified audio portion in a storage.

19. The server of claim 11, wherein the server is configured to generate the at least one modified audio portion in a streaming mode and further configured to transmit a video portion of the video file with the at least one modified audio portion to a user device.

20. The server of claim 19, wherein the server is further configured to:
acquire a new first audio portion being representative of an additional sentence in the first language;
acquire a new second audio portion being representative of an other additional sentence in a second language, the other additional sentence being a translation of the additional sentence,
the new second audio portion and a subset of second audio portions from the sequence of second audio portions forming a new sequence of second audio portions,
the subset of second audio portions excluding a first one from the sequence of second audio portions having been used to generate the at least one modified portion;
generate a new plurality of candidate arrangements for the new sequence of the second audio portions,
select a new target arrangement for the new sequence of the second audio portions from the new plurality of candidate arrangements;
generate a new modified audio portion by modifying a first one from the new sequence of second audio portions in accordance with the new target arrangement; and
transmit an other portion of the video file with the new modified audio portion to the user device.

* * * * *